(12) United States Patent
Ahnert et al.

(10) Patent No.: US 9,103,387 B2
(45) Date of Patent: Aug. 11, 2015

(54) READJUSTEMENT DEVICE FOR A FRICTION CLUTCH

(71) Applicant: Schaeffler Technologies AG & Co. KG, Herzogenaurach (DE)

(72) Inventors: Gerd Ahnert, Sasbach (DE); Ute Sabine Linden, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 40 days.

(21) Appl. No.: 14/054,891

(22) Filed: Oct. 16, 2013

(65) Prior Publication Data

US 2014/0041985 A1    Feb. 13, 2014

Related U.S. Application Data

(63) Continuation of application No. PCT/DE2012/000331, filed on Mar. 29, 2012.

(30) Foreign Application Priority Data

Apr. 21, 2011 (DE) .......................... 10 2011 018 415

(51) Int. Cl.
F16D 13/75    (2006.01)
(52) U.S. Cl.
CPC ............ F16D 13/752 (2013.01); F16D 13/757 (2013.01)

(58) Field of Classification Search
None
See application file for complete search history.

(56) References Cited

FOREIGN PATENT DOCUMENTS

| DE | 102008051100 | | 5/2009 |
|---|---|---|---|
| DE | 715 2009 004 715 | A1 * | 7/2009 |
| DE | 102009035225 | | 2/2010 |
| DE | 10 2011 106 527 | A1 * | 1/2012 |
| DE | 10 2011 082 473 | A1 * | 3/2012 |
| DE | 102011081232 | | 3/2012 |
| WO | WO 2012/010143 | A1 * | 1/2012 |

* cited by examiner

Primary Examiner — Rodney H Bonck
(74) Attorney, Agent, or Firm — Volpe and Koenig, P.C.

(57) ABSTRACT

A readjustment device for travel-controlled wear readjustment for a friction clutch includes a spindle with a spindle nut for rotating a pressure plate relative to a counter plate via a ramp system having a ramp ring for axial displacement of the pressure plate relative to the counter plate as a function of a relative rotation. The ramp ring has a first engagement device that is connected in a positively locking manner to the spindle nut. The first engagement device is designed such that, in an assembled state, the first engagement device is detachably connected to the spindle nut. This allows an inspection of the function of the readjustment device, in particular of the ramp system, in an assembled state of the readjustment device to be performed with little expenditure of time and without the risk of damage to a component, for example to the blocking elements on the pinion.

9 Claims, 3 Drawing Sheets

READJUSTEMENT DEVICE FOR A FRICTION CLUTCH

INCORPORATION BY REFERENCE

The following documents are incorporated herein by reference as if fully set forth: International Application No. PCT/DE2012/000331, filed Mar. 29, 2012, and German Patent Application No. DE 102011018415.5, filed Apr. 21, 2011.

BACKGROUND

The invention relates to a readjustment device and to a method for a friction clutch, with the aid of which it is possible to check the functioning of the assembled readjustment device up to an end position, the end of the wear range.

To compensate for the occurrence of wear on friction linings, friction clutches can be provided with a force-controlled readjustment device. In this case, an unfavorable development, due to wear, in the contact force of a lever system, e.g. a diaphragm spring, acting on the pressure plate of the friction clutch is detected, and a readjustment is effected in accordance with the contact force. As an alternative, an incorrect clearance between the clutch housing and the lever system, which occurs when there is wear on the friction linings of the clutch disk, can be determined and corrected in accordance with the incorrect clearance. For correction, compensating means, such as ramp systems or threads, arranged between the pressure plate and the lever system are rotated.

DE 10 2009 035 225 A1 previously disclosed a friction clutch having a displacement-controlled readjustment device in which a pawl which moves axially in accordance with the distance between a lever system and a pressure plate acts on a pinion of a spindle mounted rotatably on the pressure plate, wherein a spindle nut mounted on the spindle rotates a ramp ring of a ramp system, said ramp ring being arranged between the pressure plate and the diaphragm spring, when the spindle is rotated, thereby reestablishing the original distance between the lever system and the pressure plate. During the stroke of a counter plate relative to the pressure plate, the pawl slides on the teeth of the pinion and, given a predetermined wear, engages in a tooth gap between two teeth. During the next opening process of the friction clutch, the pawl takes the pinion along positively and, in the process, rotates the pinion and hence the spindle, thereby causing the spindle nut to rotate the ramp ring by a corresponding angle and hence readjusting the friction clutch. During this process, the ramp ring can be rotated from an initial position, without readjustment for wear, as far as an end position, in which there is maximum readjustment for wear.

There is a constant need to check the functioning of the fully assembled readjustment device without an increased expenditure of time and without damaging the components of the readjustment device, thereby making it possible to ensure reliable functioning of the readjustment device.

SUMMARY

It is the object of the invention to provide a readjustment device and a method for a friction clutch which allows simplified checking of the functioning of the fully assembled readjustment device in a manner which saves materials.

This object is achieved by utilizing one or more features of invention. Preferred embodiments of the invention are described below and in the claims claims.

The readjustment device according to the invention for displacement-controlled wear readjustment for a friction clutch comprises a spindle with a spindle nut for rotating a pressure plate relative to a counter plate via a ramp system having a ramp ring for moving the pressure plate axially relative to the counter plate in accordance with a relative rotation, wherein the ramp ring has at least one first engagement device, and the first engagement device is connected positively to the spindle nut. According to the invention, the first engagement device is designed in such a way that, in an assembled state, the first engagement device is releasably connected to the spindle nut.

The spindle is connected to the pressure plate by a holder and can be rotated by a pinion connected to the spindle. Through the rotating motion of the spindle, a spindle nut arranged on the spindle can be set in motion along the spindle. The spindle nut is connected positively to at least one first engagement device, wherein the positive connection can be in the form of mutually matching and interengaging sets of teeth, for example. The positive connection between the spindle nut and the first engagement device can be designed in such a way that the connection is sufficiently stable on both sides. A secure and constrained connection is thus provided in a circumferential direction, thereby making it possible to prevent unwanted movement of the ramp ring. The connection between the spindle nut and the first engagement device can be assisted by centrifugal force, wherein, for example, the contact pressure of the first engagement device on the spindle nut can be increased. The first engagement device is arranged on a ramp ring, with the result that the first engagement device can be taken along during a movement of the spindle nut and a rotating motion can be imparted to the ramp ring, whereby an axial readjustment of the pressure plate can be effected by the ramp system. In an assembled state, the ramp ring can be arranged in an initial position, wherein the first engagement device engages in the spindle nut. In the initial position, no wear readjustment takes place. Through the actuation of the readjustment device during the operation of the friction clutch, the ramp ring can be moved into an end position by action of the spindle nut. In the end position, the maximum possible axial readjustment of the pressure plate by the ramp system has been accomplished. Reverse rotation of the spindle and of the spindle nut can be avoided by the use of blocking elements. The readjustment device according to the invention comprises a first engagement device, which, in an assembled state of the readjustment device, e.g. in an initial position, can be connected releasably and/or selectably to the spindle nut. In an assembled state, the first engagement device can, for example, be moved from a first position to a second position, wherein, in the first position, a positive connection can be established between the first or an engagement device and the spindle nut and, in the second position, the positive connection between the first or an engagement device and the spindle nut can be divided. By moving the engagement device from the first position to the second position, the positive connection can be divided, thereby making it possible to allow a movement of the ramp ring independently of the spindle nut. As a result, the ramp ring can be moved freely in an assembled state of the readjustment device, e.g. from an initial position to an end position, without the need to move the spindle, the spindle nut or the pinion. As a result, it is possible to enable checking of the functioning of the readjustment device, in particular of the ramp system, with little expenditure of time and without the risk of damaging a component, e.g. the blocking elements on the pinion, in an assembled state of the readjustment device.

The first engagement device is preferably arranged on a spring element. By the arrangement of the engagement device on the spring element, the engagement device can be acted upon from the initial position to the end position by a spring force acting radially outward in the direction of the spindle nut, thereby making it possible to avoid unintentional release of the positive connection, due to dynamic effects for example. Moreover, the spring element and hence the mounting of the engagement device are elastically deformable, thereby making it possible to improve the engagement of the engagement device in the spindle nut and hence the positive locking of the positive connection.

As a particularly preferred option, the spring element is in the form of a prestressed spring plate. The spring element can be in the form of a strip-shaped, prestressed spring plate and can be arranged radially on the outside, over part of the circumference of the ramp ring. The spring element can be connected to the ramp ring by welding, adhesive bonding or riveting, for example. Radially on the outside, on the side facing the spindle nut, the spring element can have integrally formed projections for positive connection to the spindle, wherein the first engagement device can be formed by the projections. By virtue of the design of the spring element as a strip-shaped spring plate, the spring element is elastically deformable and, as a result, can improve the positive locking between the first engagement device and the spindle nut.

In a preferred embodiment, provision is made for an unlocking element to be arranged on the first engagement device, wherein the unlocking element is designed in such a way that the first engagement device can be subjected to a force directed radially inward. The unlocking element can be formed in a radial direction, e.g. in a radially inward and/or radially outward direction, directly on the first engagement device or on the spring element, wherein the unlocking element can be moved in a radial direction. An unlocking element formed substantially in a radially outward direction can enable simplified actuation of the unlocking element. The unlocking element can be moved from a first position, in which the first engagement device is connected positively to the spindle nut, to a second position, in which the positive connection between the first engagement device and the spindle nut is divided or released. The unlocking element can be of selectable design, wherein the unlocking element is capable of being retained in the first or second position. By means of the unlocking element, the release of the positive connection can be simplified, thereby making it possible to reduce the expenditure of time.

In a particularly preferred embodiment, the unlocking element is in the form of a sheet metal tab. The sheet metal tab can be formed in a radial direction, e.g. in a radially inward or radially outward direction. The sheet metal tab allows simplified actuation of the unlocking element in a manner which saves installation space.

A second engagement device is preferably provided. The second engagement device can be arranged on the same spring element as the first engagement device. The second engagement device can be formed integrally and radially on the outside of the strip-shaped spring plate, for example. In the initial position, the second engagement device does not engage in the spindle nut. After release of the first engagement device from the positive connection to the spindle nut and rotation of the ramp ring into the end position, the second engagement device can be moved into a positive connection with the spindle nut. The ramp ring can thereby be connected to the spindle nut in the end position by the second engagement device and thus retained.

The invention furthermore relates to a friction clutch comprising at least one readjustment device designed and developed as above. By the use of the positive connection between the first engagement device and the spindle nut, which connection can be released in the assembled state of the readjustment device, simple checking of the functioning of the readjustment device is made possible. Through the use of a pinion connected to a spindle, a spindle nut mounted on the spindle can rotate a ramp ring of the ramp system, said ramp ring being arranged between the pressure plate and an actuating system, when the spindle is rotated, and it is thereby possible to reestablish the original distance between the lever system and the pressure plate. In particular, the actuating system can have a lever designed as a diaphragm spring for axial movement of the pressure plate. During the stroke of the counter plate relative to the pressure plate, the pawl slides on the teeth of the pinion and, given a predetermined wear, engages in a tooth gap between two teeth. During the next opening process of the friction clutch, the pawl takes the pinion along positively and, in the process, rotates the pinion and hence the spindle, thereby causing the spindle nut to rotate the ramp ring by a corresponding angle and hence readjusting the friction clutch.

An actuating system for actuating the readjustment device can be designed as a lever system, the term "lever system" being intended to mean, in particular, a lever device which is supported on the clutch housing, forming a single-armed lever in a friction clutch which, for example, has a pull action or a two-armed lever in a friction clutch which has a push action, wherein the lever is pressed axially against the housing by one or more energy storage devices in order to be able to apply a contact force relative to the pressure plate, thereby clamping the latter axially to a counter plate, which can be designed as a single-mass flywheel or as a secondary part of a dual-mass flywheel, while forming a frictional engagement with the friction linings of a clutch disk. The lever system can preferably be designed as a diaphragm spring, which serves as an energy storage device by means of a radially outer force-exerting edge and, radially on the inside, is actuated axially by the actuating system by means of diaphragm spring tongues in a process in which said system pulls the diaphragm spring tongue toward itself to open the friction clutch. To return the pressure plate during a disengagement process with a slackening contact force, energy storage devices, such as leaf springs, which axially counteract the contact force, are provided between the clutch housing and the pressure plate, said energy storage devices moving the pressure plate in the direction of the clutch housing as the contact force slackens during the disengagement process of the friction clutch. Some of the return force of said energy storage devices can preferably be used to readjust the friction clutch, and said devices are dimensioned appropriately for this process.

The readjusting device can control a rotation device, which can be mounted on the pressure plate; for example, a sheet metal holder, by which the rotation device is mounted, can be riveted to the pressure plate. The rotation device can be embodied in such a way that a force transmitted axially to the rotation device is converted by a gear mechanism into a force acting in the circumferential direction on the ramp system. The rotation device can preferably be a spindle which is mounted rotatably on the pressure plate, is driven by the pinion and receives a spindle nut which engages positively in a ramp system of annular configuration. In this case, the ramp system can, for example, be a ramp ring with axially formed ramps distributed over the circumference, which enters into interaction with counter ramps formed or mounted in a corresponding manner on the pressure plate, with the result that the axial height increases as the ramps are rotated in the direction of the opposed ramp slopes of the ramp ring and the counter ramps. For positive engagement of the spindle nut, the ramp ring can have a number of recesses corresponding to the number of engagement means, by means of which recesses the engagement means form a positive lock. In this case, the engagement means can be profiles provided on the spindle nut, e.g. spherical-cup-type, spherical or similarly shaped profiles formed of the material of the latter, which can be pivoted so as to engage in the recesses, with the result that, in the case of a linear movement of the spindle nut along the spindle, the profiles of the recesses rotated by the latter in a circular arc can pivot in a corresponding manner in the recesses or can move with a radial play in the recesses. In this case, the profiles can have an outer radius which is matched to a circular-arc-shaped design of the recesses and to the relative rotation of the spindle nut and the ramp ring, with the result that they rotate relative to one another without play during a readjustment process. It has been found that two recesses entering into interaction with two profiles can be advantageous, wherein the profiles can also be provided on the ramp ring and the recesses on the spindle nut. It is self evident that the spindle nut is moved on the spindle while being secured against rotation. The pitch of the thread of the spindle and of the spindle nut is designed in such a way that the rotation device has a self locking action. On the other hand, the pitch of the thread can be matched to the desired angle of rotation of the ramp ring by which said ring is to be rotated during a readjustment process.

To control the rotation by the readjustment device, the readjustment device and the rotation device enter positively into interaction with one another in the case of readjustment. It is advantageous here if the readjustment device is secured on the clutch housing, thus enabling the clutch housing with the lever system and the readjustment device and the pressure plate with the ramp system to be partially assembled as mutually independent modules during assembly. The pinion has a circumferential profile, e.g. teeth distributed over the circumference on the outer circumference or on a smaller, axially offset radius, which teeth can be designed in the manner of sawteeth so as to face away from the pressure plate in order to better form a positive lock with the readjustment device.

The invention furthermore relates to a method for checking the functioning of a friction clutch having a readjustment device designed and developed as described above, comprising the following steps:
   providing an assembled readjustment device, wherein a ramp ring of the readjustment device is arranged in an initial position, wherein a first engagement device is connected positively to a spindle nut,
   actuating an unlocking element to release the positive connection between the first engagement device and the spindle nut,
   rotating the ramp ring from the initial position to an end position, checking the axial advance of the readjustment device,
   rotating the ramp ring back into the initial position,
   actuating the unlocking element for positive connection of the first engagement device to the spindle nut.

In the initial position, the assembled readjustment device does not exhibit any axial readjustment by the ramp system. By actuating the unlocking element, the movement of the unlocking element from the first to the second position, the positive connection between the first engagement device and the spindle nut can be released, thereby allowing the ramp ring to be moved freely and independently of the spindle nut, the spindle and the pinion. The unlocking element can be retained in the second position. The ramp ring can then be rotated from the initial position to the end position, wherein the maximum possible axial readjustment of the readjustment device can be performed by means of the ramp system. The axial readjustment of the pressure plate can be checked, and clutch parameters can be recorded, e.g. in the form of characteristic curves. After the functioning of the readjustment device has been checked and/or clutch parameters have been recorded, the ramp ring can be rotated back into the initial position. By actuating the unlocking element again, movement from the second to the first position, the positive connection between the first engagement device and the spindle nut can be reestablished. Simplified and time-saving checking of the functioning of the readjustment device can thereby be made possible.

The method preferably additionally comprises the following steps:
   actuating the unlocking element in the end position to produce a positive connection between a second engagement device and the spindle nut, and
   actuating the unlocking element in the end position to release the positive connection between the second engagement device and the spindle nut. This is made possible, in particular, by the provision of a readjustment device with a second engagement device. By actuating the unlocking element in the end position, a positive connection between the second engagement element and the spindle nut can be established, thereby making it possible to avoid movement of the ramp ring in the end position. This allows an improvement of the characteristic curves determined.

BRIEF DESCRIPTION OF THE DRAWINGS

The invention is explained below by way of example by preferred illustrative embodiments with reference to the attached drawings, in which.

DETAILED DESCRIPTION OF THE PREFERRED EMBODIMENTS

Figure 1:
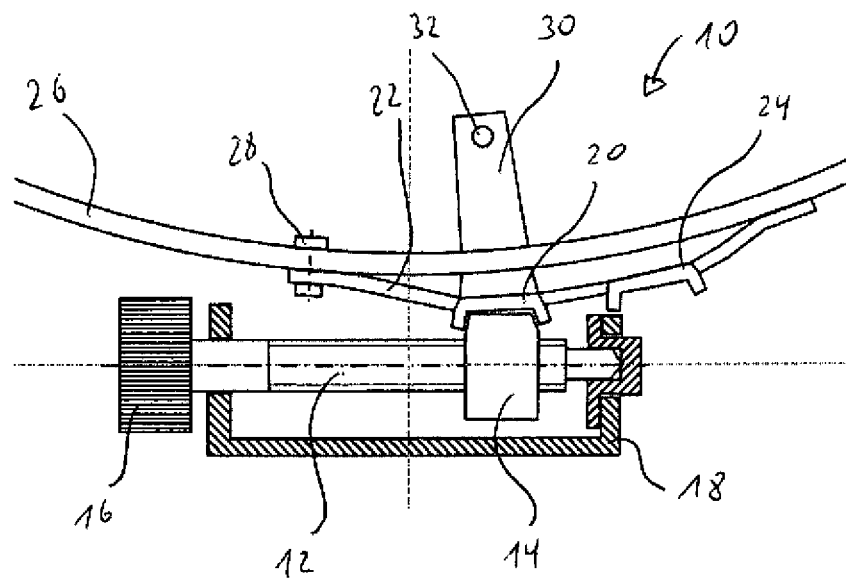
FIG. 1: shows a schematic illustration of a readjustment device according to the invention.

For actuation of a readjusting movement, the readjustment device 10, which is illustrated in an initial position in FIG. 1, has a spindle 12, on which a spindle nut 14 and a pinion 16 are arranged. The spindle 12 is secured on a pressure plate (not shown) by a spindle holder 18. The spindle nut 14 is connected positively to a first engagement device 20, which is formed on a spring element 22 in the form of a strip-shaped, prestressed spring plate. Arranged on the spring element 22 is a second engagement device 24, which is not in positive engagement with the spindle nut 14 in the initial position. The spring element 22 is arranged radially on the outside on a ramp ring 26 and extends along part of the circumference of the ramp ring 26. At one end of the spring element 22, the connection of the spring element 22 to the ramp ring 26 is in the form of a rivet 28, wherein the other end of the spring element is welded or adhesively bonded to the ramp ring 26, for example. Arranged on the first engagement device 20 is an unlocking element 30, wherein the unlocking element 30 projects radially inward into the ramp ring 26. The unlocking element 30 is illustrated in a first position, in which an engagement device 20, 24, in particular the first engagement device 20, is connected positively to the spindle nut 14. The unlocking element 30 is in the form of a sheet metal strip and, radially on the inside, has an opening 32, which is intended to accept a tool hook for actuating the unlocking element 30, for example.

Figure 2:
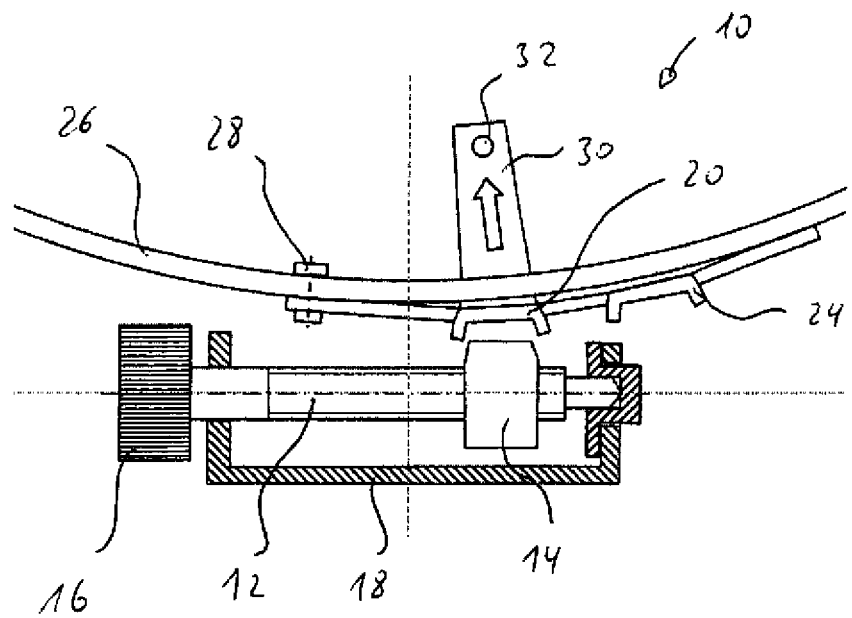
FIG. 2: shows a schematic illustration of a readjustment device in an initial position.

In FIG. 2, the unlocking element 30 is illustrated in a second position, in which the positive connection between the engagement device 20, 24, in particular the first engagement device 20, and the spindle nut 14 has been released, thus allowing the ramp ring 26 to be rotated independently of a spindle 12.

Figure 3:
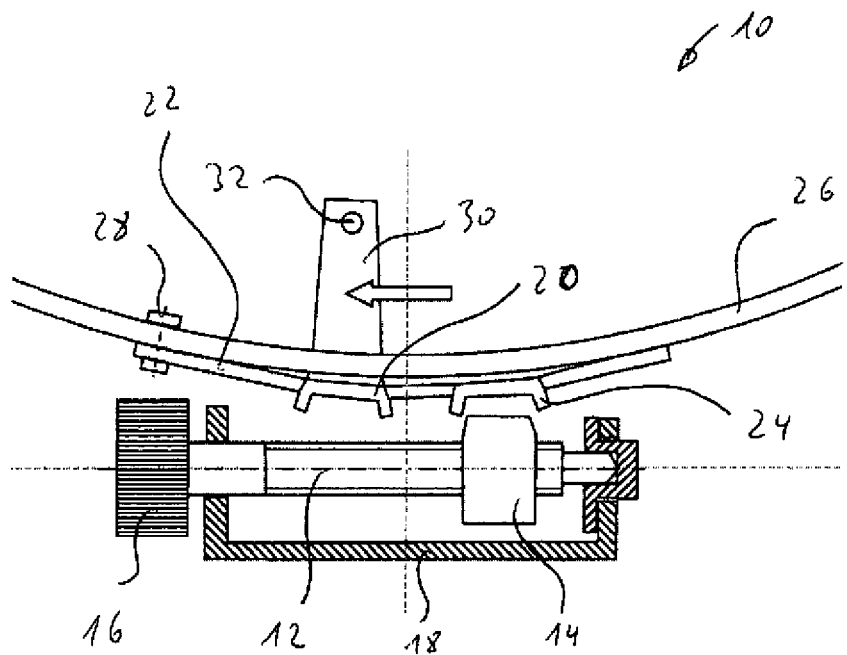
FIG. 3: shows a schematic view of a ramp ring pivoted into an end position.

FIG. 3 shows a readjustment device 10 pivoted into an end position. The ramp ring 26 has been pivoted from the initial position to the end position in the direction of the arrow. In the end position, the second engagement device 24 is arranged on the spindle nut 14, wherein the unlocking element 30 is illustrated in the second position. The second engagement device 24 is not connected positively to the spindle nut 14.

Figure 4:
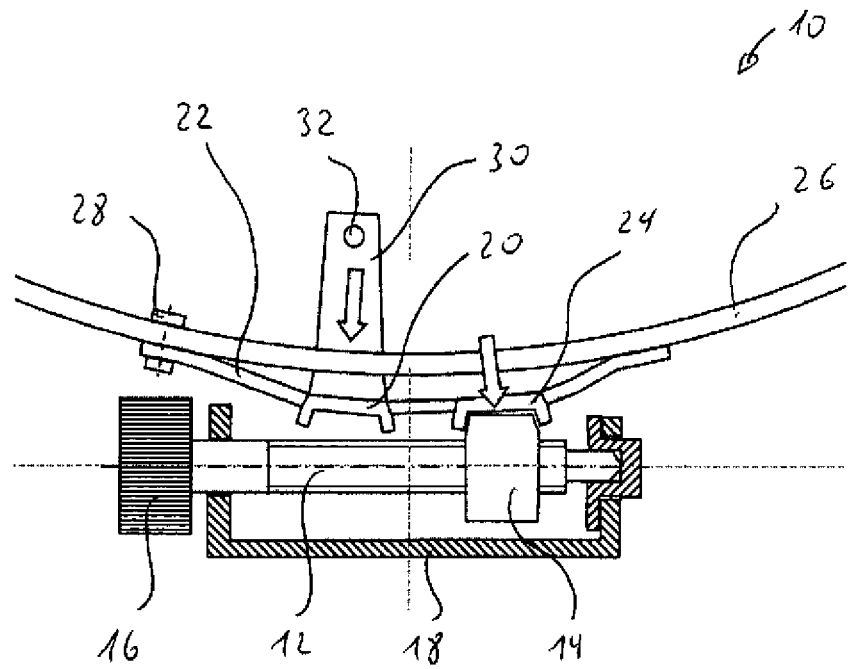
FIG. 4: shows a schematic view of the ramp ring illustrated in FIG. 3 with a positive connection between a second engagement device and a spindle nut.

A positive connection in the end position (FIG. 4) between the second engagement device 24 and the spindle nut 14 is achieved by a movement of the unlocking element 30 from the second position to the first position. Through the flexible design of the spring element 22, the unlocking element 30 arranged on the first engagement device 20 can be moved in a radial direction toward the second engagement device 24.

Figure 5:
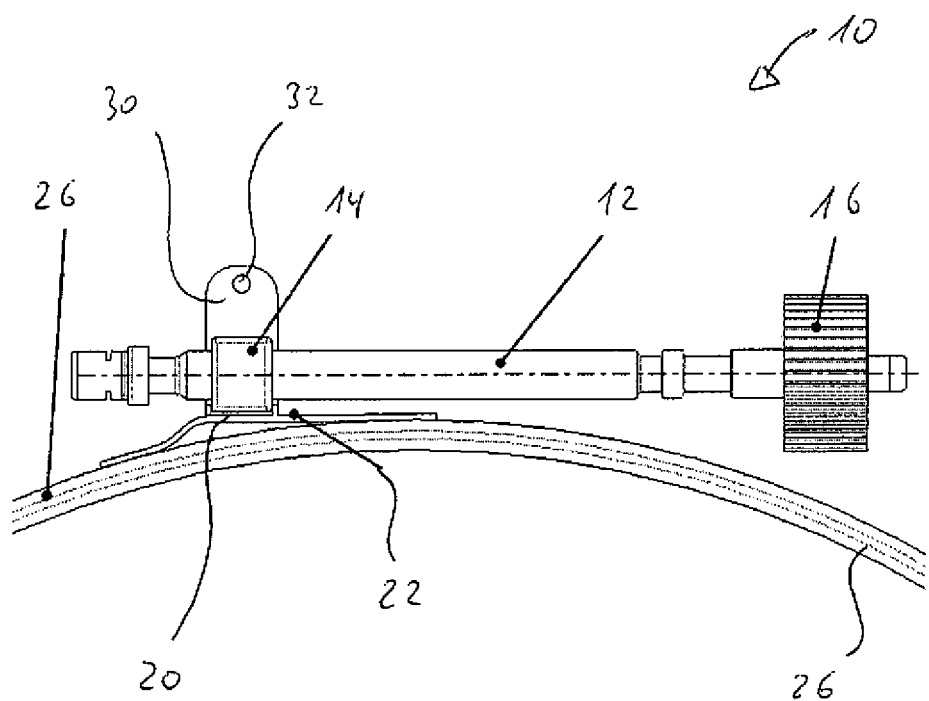
FIG. 5: shows a schematic illustration of a readjustment device with an unlocking element arranged radially on the outside.

A readjustment device 10 with an unlocking element 30 arranged radially on the outside is illustrated in FIG. 5. The unlocking element 30 is arranged on the first engagement device 20 and at least partially overlaps the spindle nut 14. The unlocking element 30 projects radially outward beyond the spindle nut 14 and, radially on the outside, has an opening 32. The arrangement of the unlocking element 30 radially on the outside makes it possible to improve the actuation of the unlocking element 30 since the opening 32 is more accessible than in the case of an opening 32 arranged radially on the inside, for example. The spring element 22 is connected to the ramp ring 26 by welding or adhesive bonding, for example.

LIST OF REFERENCE SIGNS 10 readjustment device
12 spindle
14 spindle nut
16 pinion
18 spindle holder
20 first engagement device
22 spring element
24 second engagement device
26 ramp ring
28 rivet
30 unlocking element
32 opening

The invention claimed is:

1. A readjustment device for displacement-controlled wear readjustment for a friction clutch, comprising:
a spindle with a spindle nut adapted to rotate a pressure plate relative to a counter plate by a ramp system having a ramp ring that moves the pressure plate axially relative to the counter plate in accordance with a relative rotation,
the ramp ring has at least one first engagement device,
the first engagement device is connected positively to the spindle nut, and
in an assembled state, the first engagement device is releasably connected to the spindle nut.

2. The readjustment device as claimed in claim 1, wherein the first engagement device is arranged on a spring element.

3. The readjustment device as claimed in claim 2, wherein the spring element is a prestressed spring plate.

4. The readjustment device as claimed in claim 1, wherein an unlocking element is arranged on the first engagement device, the unlocking element is adapted to subject the first engagement device to a force directed radially inward.

5. The readjustment device as claimed in claim 4, wherein the unlocking element is a sheet metal tab.

6. The readjustment device as claimed in claim 1, further comprising a second engagement device.

7. A friction clutch comprising at least one readjustment device according to claim 1.

8. A method for checking the functioning of a friction clutch having an assembled readjustment device including a spindle with a spindle nut adapted to rotate a pressure plate relative to a counter plate by a ramp system having a ramp ring that moves the pressure plate axially relative to the counter plate in accordance with a relative rotation, the ramp ring having at least one first engagement device, the first engagement device being connected positively to the spindle nut, and in an assembled state, the first engagement device is releasably connected to the spindle nut, the method comprising the following steps:
arranging the ramp ring of the readjustment device in an initial position, in which the first engagement device is connected positively to a spindle nut,
actuating an unlocking element to release the positive connection between the first engagement device and the spindle nut,
rotating the ramp ring from the initial position to an end position,
checking an axial advance of the readjustment device,
rotating the ramp ring back into the initial position,
actuating the unlocking element for positive connection of the first engagement device to the spindle nut.

9. The method as claimed in claim 8, further comprising the following steps:
actuating the unlocking element in the end position to produce a positive connection between a second engagement device and the spindle nut, and
actuating the unlocking element in the end position to release the positive connection between the second engagement device and the spindle nut.

* * * * *